Figure 1:
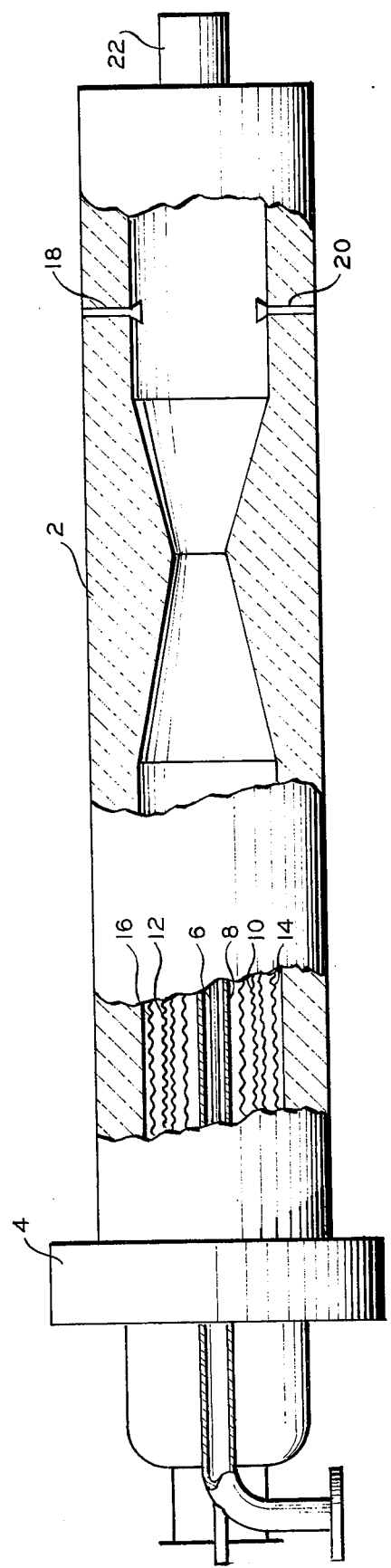

United States Patent [19]

Gunnell

[11] 4,030,889

[45] June 21, 1977

[54] CARBON BLACK REACTOR WITH ADJUSTABLE FLAME LENGTH

[75] Inventor: Thomas J. Gunnell, Bartlesville, Okla.

[73] Assignee: Phillips Petroleum Company, Bartlesville, Okla.

[22] Filed: Mar. 4, 1976

[21] Appl. No.: 663,933

[52] U.S. Cl. .............................. 23/259.5; 423/456; 431/173; 431/174; 431/189; 110/28 F; 239/402.5; 239/403

[51] Int. Cl.² .................. C01B 49/00; C10B 47/00

[58] Field of Search ................. 23/259.5; 423/456; 431/173, 174, 189; 110/28 F; 122/235 P; 239/402.5, 403, 404, 399, 400, 401, 402

[56] References Cited

UNITED STATES PATENTS

| | | | |
|---|---|---|---|
| 2,196,282 | 4/1940 | Voorheis | 431/174 |
| 2,243,909 | 6/1941 | Kruger | 122/235 P |
| 2,395,276 | 2/1946 | Jordan | 431/174 |
| 2,801,157 | 7/1957 | Campbell et al. | 23/259.5 X |
| 2,941,518 | 6/1960 | Firl | 122/235 P |

*Primary Examiner*—James H. Tayman, Jr.

[57] ABSTRACT

The flame length in axial direction of a tubular carbon black reactor is made adjustable by providing a means to adjust the pivot angle between the direction of the longitudinal axis and the axis of a fuel gas or fuel oil discharge nozzle of a burner.

11 Claims, 9 Drawing Figures

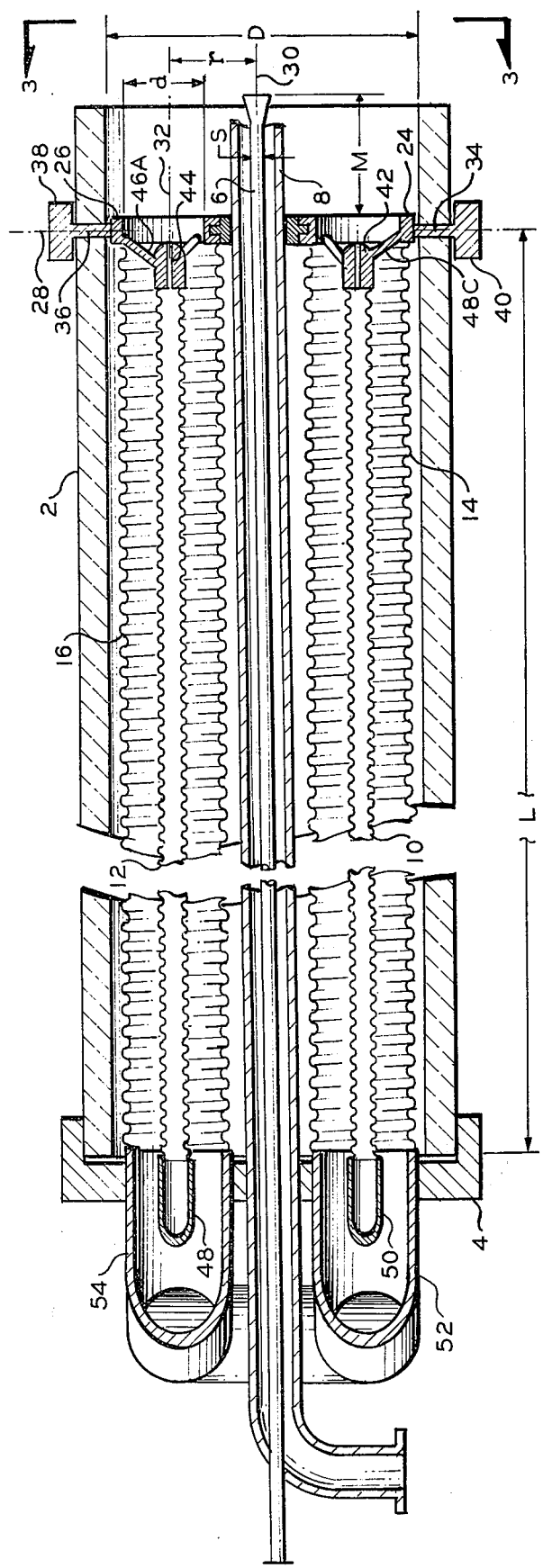
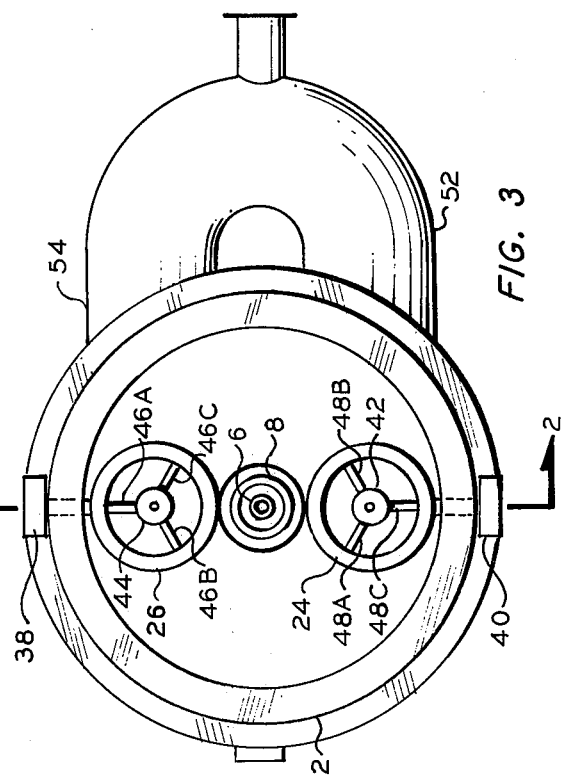

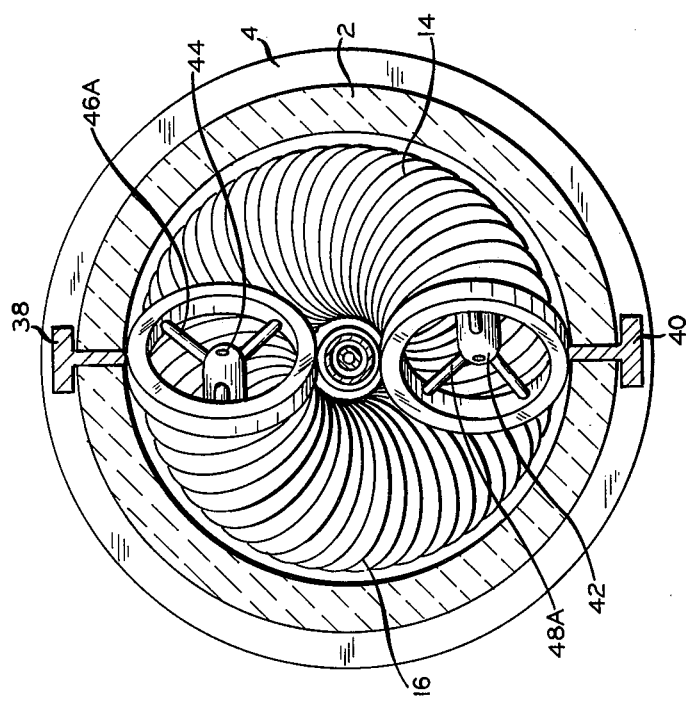

CARBON BLACK REACTOR WITH ADJUSTABLE FLAME LENGTH

This invention relates to carbon black reactors. In one of its more specific aspects, this invention relates to a tubular carbon black reactor having fuel oil or fuel gas burners for the generation of hot combustion gases.

BACKGROUND OF THE INVENTION

Carbon black is commonly produced by pyrolytic decomposition of hydrocarbons. The heat for this decomposition is usually provided by the combustion of fuel gas and air. The hydrocarbon feed used can be a gaseous hydrocarbon or a normally liquid hydrocarbon.

It is known in the art that a furnace-type carbon black, which can be used as an important ingredient in a rubber, both for tire tread and tire carcass, can be produced by contacting the hydrocarbon with hot combustion gases in a tubular or essentially cylindrical reactor. Such a reactor generally consists of a steel shell and a refractory lining made from, e.g., ceramic material.

Several parameters influence the properties of carbon black. Flow velocities, air to hydrocarbon ratio, gas to hydrocarbon ratio, reactor shape, etc., are important parameters. The change of any one of these parameters changes the properties of carbon black considerably. In order to utilize this situation, it has been proposed to make the axial position of the oil nozzle adjustable. Another proposal in the art is to make the size of a combustion chamber adjustable and to make the speed of hot combustion gases introduced into a reactor adjustable. By these various adjustments, the properties of carbon black can be controlled.

It would be desirable to have a carbon black reactor available in which the axial flame length of burners producing hot combustion gases can be adjusted. This would be particularly advantageous if it could be done without changing the quantity or composition of hot combustion gases, since these parameters also influence the properties of the carbon black produced.

THE INVENTION

It is thus one object of this invention to provide a novel carbon black reactor in which a wide variety of carbon blacks can be produced.

Another object of this invention is to provide a novel carbon black reactor in which the axial length of the flames of burners can be adjusted without changing the quantity of fuel oil or fuel gas and oxidant introduced into the reactor.

A further object of this invention is a carbon black reactor in which the flame length of the burner in axial direction can be adjusted while the carbon black reactor is in operation.

Figure 6:
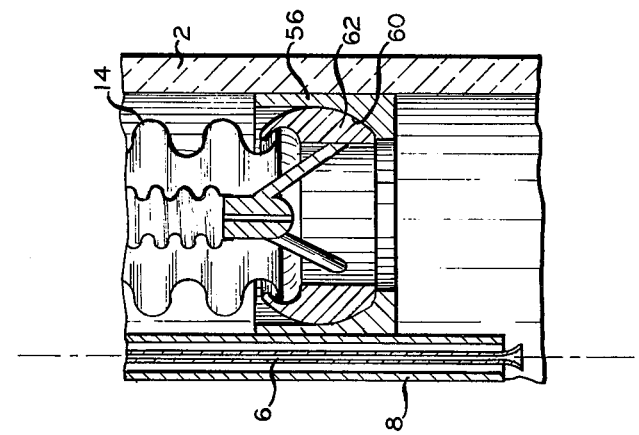
Figure 5:
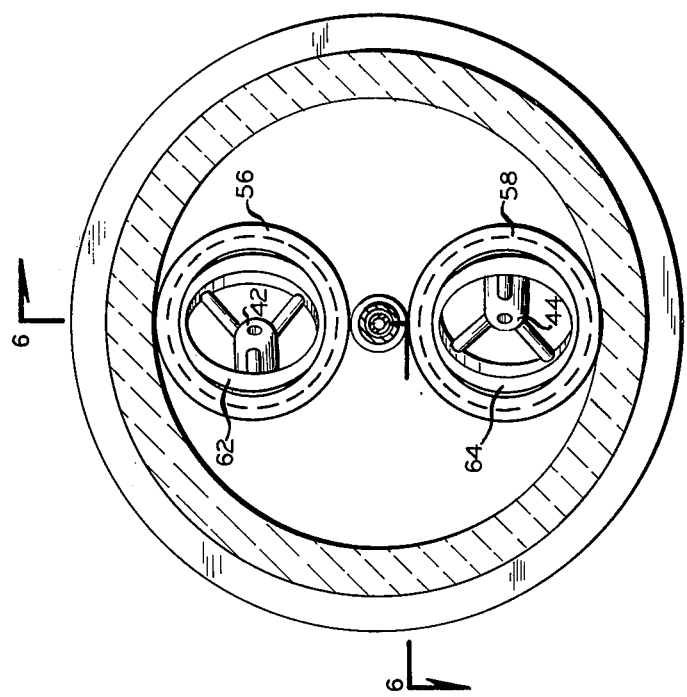
Figure 7:
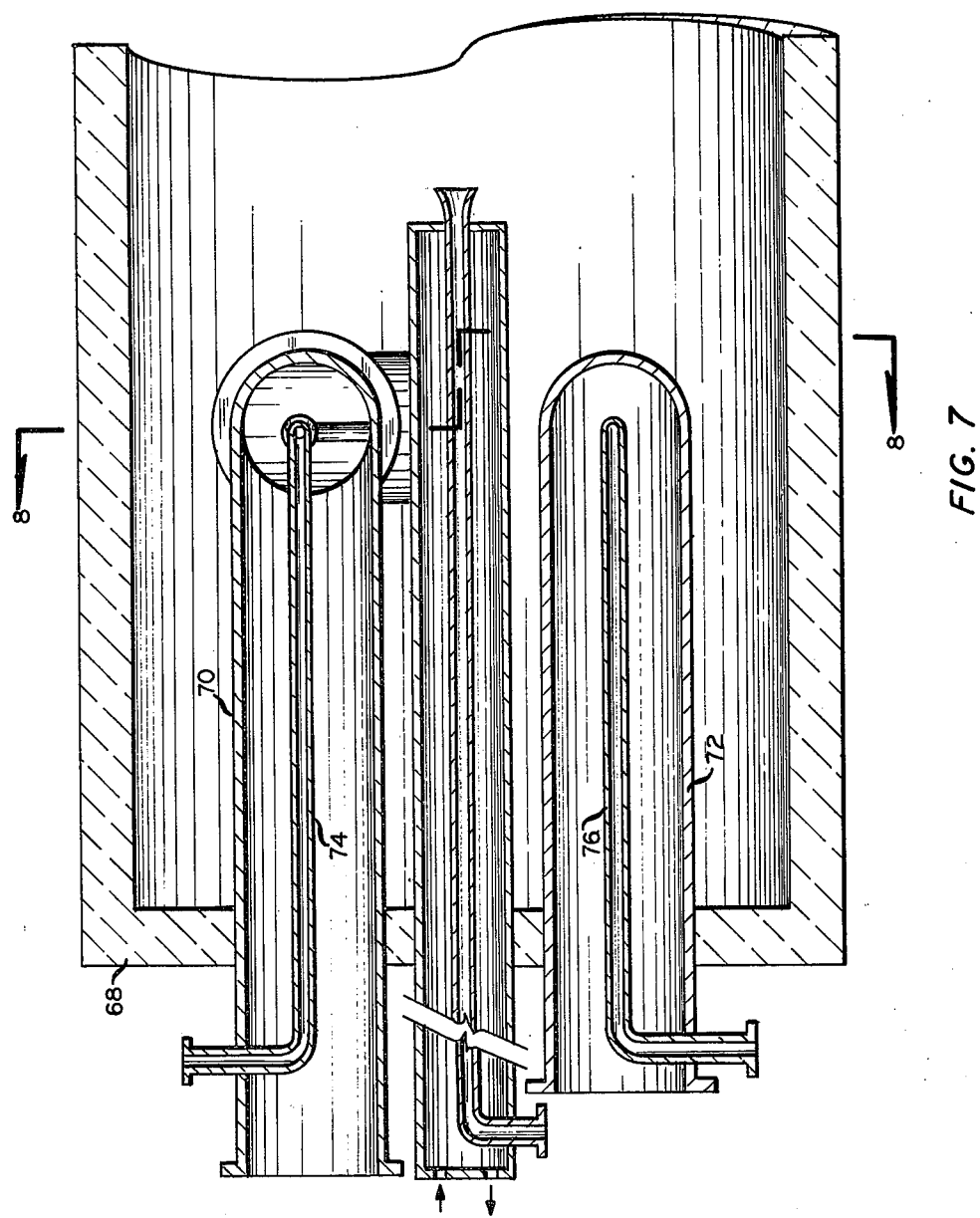
Figure 9:
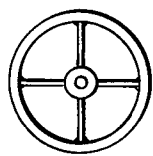
Figure 8:
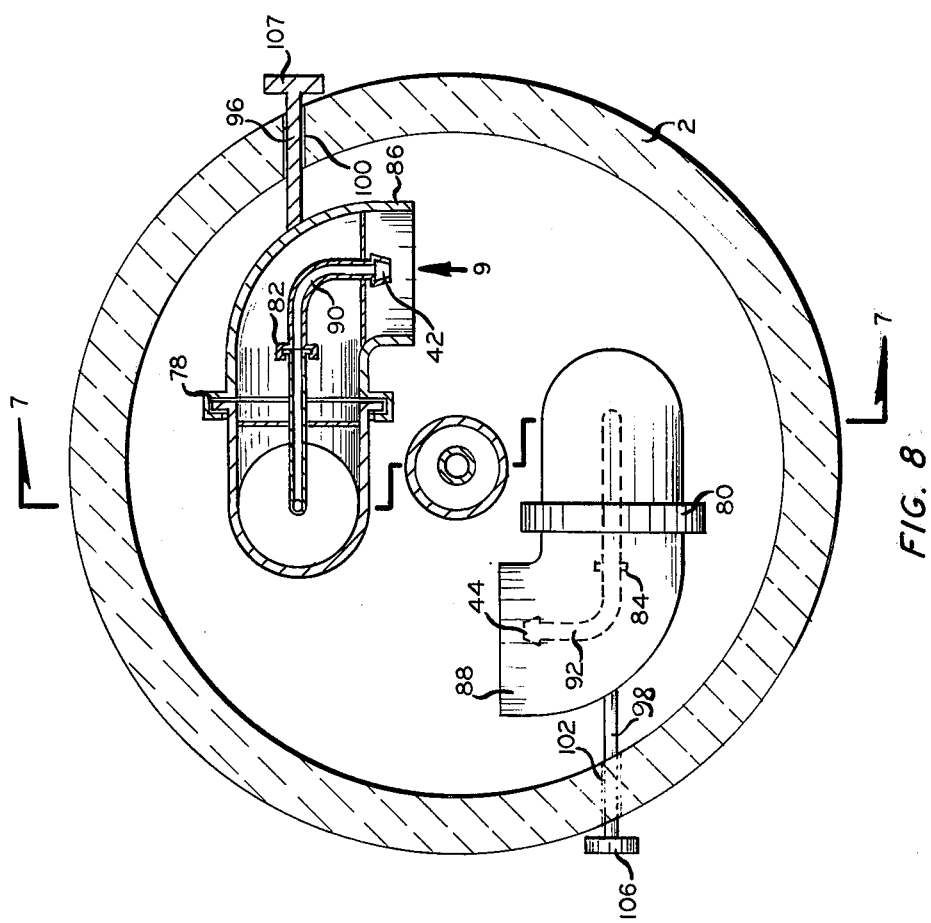

These and other objects, advantages, details and features of this invention will become apparent to those skilled in the art from the following detailed description of the invention, the appended claims and drawing in which FIG. 1 shows a tubular carbon black reactor schematically and partly in cross-section, FIGS. 2 and 3 show one embodiment of the upstream portion of the carbon black reactor in cross-section, FIG. 4 shows a view of the front end of the carbon black reactor in upstream direction with the air and gas channels twisted, FIGS. 5 and 6 show another embodiment of the front end of the carbon black reactor, FIGS. 7 and 8 show a still further embodiment of the carbon black reactor with adjustable flame length, and FIG. 9 shows a detail of the attachment of the gas pipe in the air channel of the front end of the carbon black reactor shown in FIGS. 7 and 8.

In accordance with this invention, there is now provided a carbon black reactor in which hot combustion gases are produced with a flame length that is adjustable in axial direction. This carbon black reactor comprises a tubular, essentially cylindrically shaped housing with circular cross-section defining a longitudinal axis, at least one burner located inside of said housing for combusting a fuel and oxidant to form hot combustion gases, said burner comprising a fuel discharge nozzle for introducing fuel gas (as an example of a fuel) into said housing, oxidant feed means for feeding oxidant into the housing essentially parallel to the direction of the fuel gas discharge and into admixture with the gas leaving the gas discharge nozzle and means attached to the housing for adjusting the pivot angle, which is defined as the angle between the direction of the longitudinal axis of the tubular reactor and the axis of the fuel gas discharge nozzle; the carbon black reactor of this invention also comprises hydrocarbon feed means attached to the housing and means for withdrawal of carbon black-containing smoke from the housing.

The important feature of this invention is that the angle between the fuel nozzle axis and the longitudinal reactor axis is adjustable. The fuel nozzle axis is either defined geometrically by the structure of the nozzle, or if a different nozzle construction is employed instead of the nozzle axis, the main or central gas discharge direction forms the adjustable pivot angle with the direction of the longitudinal axis. Fuel gas and oxidant are fed parallel and discharged at approximately the same location into the housing. The pivot angle thus defines the angle between the longitudinal reactor axis and the flame generated by the burner.

Whereas it is within the scope of this invention to employ only one burner, it is presently and for symmetry reasons preferred to employ at least two burners within the carbon black reactor. These burners are arranged symmetrically around the axis of the carbon black reactor and at the same distance from the axis. The means for adjusting the pivot angle are such that the axis of the gas nozzle or the flame direction can be changed from a position parallel to the longitudinal axis to a position where the flame or the nozzle axis are at an angle of 90° with the longitudinal axis. This pivot angle between the longitudinal reactor axis and the nozzle axis or flame direction is measured around a pivot axis which is perpendicular both to the longitudinal reactor axis and to the nozzle axis or flame direction. Thus the burner during the adjustment of the angle is turned essentially in a plane which is essentially parallel to the longitudinal axis. This plane has a distance from the longitudinal axis which is equal to the distance of the gas nozzle from the longitudinal axis.

The adjustment of the pivot angle is achieved in accordance with one embodiment of this invention by providing at least one gas channel and at least one oxidant channel, both channels surrounding the longitudinal axis of the reactor helically in the same rotational sense, and by providing means for adjusting the pitch of these helices. One gas discharge nozzle is attached to each downstream end of each gas channel. The main gas discharge direction, or the nozzle axis, is essentially parallel to the tangent from the helix of the center of the respective channel at the discharge point. Thus by changing the pitch, the pivot angle is being changed. If the pitch is infinite, the gas and oxidant channel are essentially parallel to the longitudinal axis and the pivot angle is 0°. If the pitch becomes very small, the pivot angle in this embodiment reaches a value approaching 90°. The pivot angle would be 90° if the pitch were 0, which is technically unfeasible since the gas channel and the air channel would have 0 diameter. Thus with this embodiment of helically shaped gas and oxidant channels with adjustable pitch, the range for the pivot angle will be between 0° and 70°.

In order to make the gas channel and the air channel helical and to provide the possibility of adjusting the pitch, these channels have to be confined by flexible walls. In accordance with a preferred embodiment of this invention, these channels are confined by flexible metal bellows. Bellows made from stainless steel, and in particular from high chromium steel, provide sufficient heat resistance and flexibility to be used for the purposes of this invention and are therefore preferred.

The discharge ends of the flexible channels are provided with refractory end or nozzle pieces. These end pieces can be either formed like a ball joint having a discharge opening therethrough or can be formed like a pivotally arranged plate with a discharge hole or opening therethrough. If these end pieces are shaped like a ball joint, one of its portions is attached to the reactor wall, whereas the other portion is attached to the flexible channel. Thus when the pitch of the helices is changed, the end of the channel will swivel accordingly and adjust the discharge direction essentially parallel to the helix defined by the adjusted pitch. In order to guarantee the proper arrangement of the discharge end of the helically shaped channels, additional means for tilting the discharge ends around the pivot axis can be provided for. These means can consist of an axle or rod attached to the discharge end of the respective flexible channel and means to turn this rod with the further provision that this rod is essentially coextensive with the pivot axis defined above.

The means for adjusting the pitch of the helical channels in accordance with a preferred embodiment of this invention comprises a plate to which the ends of the channels are attached and which plate is arranged essentially perpendicularly to the longitudinal reactor axis and for rotation around this longitudinal axis. This plate can be arranged at the upstream end of the carbon black reactor. It is, however, presently preferred to arrange this plate at the downstream end of the flexible channels at or close to the discharge of the gas and the air. Thereby the portion of the flexible channels that influence the flame direction most strongly is adjusted as desired so that the accuracy of the adjustment of the flame angle is enhanced.

In accordance with another embodiment of this invention, the ends of the flexible channels are arranged telescopically in an end plate. By this arrangement the compensation for the channel length necessary when changing the pitch is achieved by adding or withdrawing parts of the channel eventually in addition to expanding the channel.

In one embodiment of this invention, the fuel gas channel is formed by a flexible tube arranged between the inner wall of the housing of the reactor and a central core pipe. The diameter of this tubing is essentially the same as the distance between the core pipe and the wall. The air channel in this case can be either made from a separate flexible channel or the air channel can be simply the space between the gas channels. Since the fuel gas channels are arranged helically, the space between these channels is also helically shaped and has the same rotational sense. Thus gas and air flow in essentially the same direction so that the angle of the flame with the longitudinal axis is defined by the angle between the tangent to the helix formed with the longitudinal axis at the point of discharge.

In order to provide a defined and controllable flame, it is presently preferred to form the oxidant channel out of a flexible conduit having essentially circular cross-section and to arrange the gas conduit, which is also formed from a flexible conduit, in the center of this oxidant channel. The gas discharge nozzle is kept in the proper central position within the air channel at the discharge end by an attachment piece. Preferably a further attachment piece is provided for a couple of inches upstream of the discharge end. Thus the adjusting of the pitch of the flexible oxidant channel also adjusts the direction of the gas discharge to be coextensive with the center line of the oxidant channel.

In addition to using a flexible channel for the gas and the oxidant, it is within the scope of this invention to arrange at least one pivotally arranged burner inside of the housing. Advantageously and in accordance with a preferred embodiment of this variation of the invention, the gas discharge nozzle is connected to one side of a gas conduit connection having two sides which can be rotated relative to each other around an axis of rotation which is essentially perpendicular to the longitudinal reactor axis, and wherein the second side of this gas conduit connection is attached to a gas supply conduit arranged stationary within the housing. A discharge end plate can be provided for that shields the gas conduit connection from the radiation from the carbon black reactor.

In this embodiment, too, it is preferred to provide an oxidant channel the discharge end of which is pivotally arranged and to attach the gas discharge nozzle concentrically to the discharge end of the oxidant channel. Advantageously an oxidant conduit connection or swivel joint similar to the gas conduit connection described above is used for the oxidant channel. The axis of rotation of this swivel joint is also essentially perpendicular to the axis of the reactor. The gas conduit connection and the oxidant conduit connection, or the two swivel joints, do not have to be arranged in the same plane, however, the axis of rotation of the two swivel joints are coextensive. For service purposes, it is advantageous to provide the swivel joint for the central gas conduit as close to the gas discharge nozzle as possible.

In accordance with a presently preferred embodiment, the axis of rotation of the gas connection and of the oxidant conduit connection does not intersect the longitudinal reactor axis; rather the axis of rotation at the point closest to the reactor axis has a distance from this reactor axis that is roughly one fourth of the internal diameter of the reactor at the location of the pivotally arranged burners.

The means for feeding hydrocarbon into the reactor and into contact with the hot combustion gases produced can be arranged in any conventional manner. An axial feed nozzle can be used that discharges the hydrocarbon at the reactor axis and essentially in axial direction. If for the production of a specific carbon black it is desired to inject the hydrocarbon radially, it is within the scope of this invention to provide hydrocarbon discharge nozzles in the walls of the reactor for radial injection of hydrocarbons.

Downstream of the burners described above, the reactor preferably is provided with a choke. This choke increases the axial velocity of the reagent. The choke can be either a cylindrical constriction or a venturi-shaped constriction. In case of the use of a venturi-shaped constriction, it may be desirable to arrange the hydrocarbon feed means for injecting hydrocarbon at or slightly downstream of the venturi throat where the highest turbulence of the hot combustion gases occurs.

Quench means for injecting a quenching fluid, usually water, can be provided for near the downstream end of the carbon black reactor.

The carbon black reactor described can be operated with any conventional reagents. The hydrocarbon feed can be a normally gaseous hydrocarbon or a normally liquid hydrocarbon feed. In case a carbon black with a high structure is desired, a highly aromatic oil is used. Such an oil would have a BMCI of about 100 to about 150. The gas used for the production of the hot combustion gases can be any gas that provides sufficiently hot combustion gases. Examples for such gases are methane, ethane, propane and natural gas. The oxidant used for the combustion of the gas is a gas containing free oxygen. Oxygen, oxygen-enriched air, and air are examples for such oxidant gases. The reagent employed in the carbon black reaction can be preheated as is well known in the art in order to provide an even higher decomposition temperature.

The carbon black is withdrawn from the reactor as a carbon black-containing smoke via a conduit and is passed to the further operations such as filtering, pelleting, oxidizing, etc. The carbon black produced is a valuable rubber reinforcing ingredient.

The invention will be still more fully understood from the following description of the drawings.

FIG. 1 shows a carbon black reactor schematically in cross-section. The reactor comprises a housing 2, which is essentially a longitudinally extended cylindrically shaped housing. At the upstream end of the housing 2 or the reactor shell a cap 4 is arranged through which conduits for the reagents extend. Make or feed oil is introduced into the reactor via the central line 6, which is surrounded by a pipe 8 through which so-called jacket air is introduced into the reactor in order to cool the oil feed nozzle.

Flexible steel bellows 10 and 12 are arranged for the introduction of gas to a burner. Surrounding the steel bellows 10 and 12 further steel bellows 14 and 16 are provided for through which oxidant for the combustion of the gas in introduced into the reactor.

Near the downstream end of the reactor, quench nozzles 18 and 20 permit the introduction of quenching water into contact with the hot reactant mass. Carbon black-containing smoke is withdrawn via conduit 22 from the downstream end of the reactor.

The invention will be now explained in some more detail in connection with FIGS. 2 and 3, which show one embodiment for the adjustable pivot angle. The flexible air channels 14 and 16 are attached with their discharge ends to ceramic rings 24 and 26, respectively. These ceramic rings are pivotally arranged so that they can tilt around the axis 28, which is perpendicular both to the longitudinal axis 30 of the reactor and to the main discharge direction or nozzle axis 32. Attached to the ceramic rings 24 and 26 are rods 34 and 36 via which the rings 24 and 26 can be tilted by means of wheels 38 and 40, respectively.

The flexible gas lines 10 and 12 are attached to the ceramic gas discharge nozzles 42 and 44, respectively. These gas discharge nozzles 42 and 44 are kept in central position within the air channels 14 and 16, respectively, by 3 radial connecting pieces 46A, 46B, 46C and 48A, 48B and 48C, respectively, connecting the nozzles with the rings 24 and 26.

At the upstream end of the carbon black reactor housing 2, there is provided a cap 4. To this cap the flexible gas conduits 10 and 12, as well as the flexible air channels 14 and 16 are attached. Also attached to this cap are supply conduits 48 and 50 to introduce gas into the flexible conduits 10 and 12, as well as air supply conduits 52 and 54 to introduce air into the flexible channels 14 and 16. When the cap 4 is rotated around the longitudinal reactor axis 30, the flexible conduits 10, 12, 14 and 16 will arrange essentially in helical pattern around the conduit 8 surrounding make oil conduit 6, whereby the bellow-shaped conduits 10, 12, 14 and 16 are extended, as well as bent, and whereby the rings 24 and 26, together with nozzles 42 and 44, are tilted around the axis 28. If the tilting is insufficient, it can be increased by turning the wheels 38 and 40, respectively, in the desired direction. By this procedure the pivot angle between the flame and the longitudinal reactor axis 30 or the angle beween the axis 32 and the axis 30 can be adjusted and thus the axle flame length can be adjusted.

FIG. 4 shows essentially the same view as FIG. 3, however, it shows the reactor in a position in which the cap 4 has been turned. As can be seen, the burners have been turned around the pivot axle into a position where the flame forms an angle of about 45° with the longitudinal reactor axis 30. How far cap 4 has to be turned in order to achieve this position depends mainly on the axial length and diameter of the bellows.

FIGS. 5 and 6 show a further embodiment of this invention, using a ball joint type end piece rather than a pivotally arranged ring as the downstream end of the gas channel. Ceramic pieces 56 and 58, respectively, are attached to the housing 2. These ceramic pieces 56 and 58 have a cylindrical opening at the downstream end, which has a spherically shaped section 60. The upstream end of these pieces 56 and 58 is essentially cylindrical, but widened slightly toward the side.

In the spherically shaped section 60 of the end pieces 56 and 58, spherical inserts 62 and 64, respectively, are arranged. These spherical inserts 62 and 64 have cylindrical openings for the air and are attached to the flexible bellows 14 and 16, respectively, in such a manner that the bellows 14 and 16 can rotate relatively to these spherically shaped end pieces 62 and 64. The nozzles 42 and 44 are attached to the pieces 62 and 64, respectively, in the same manner as described above in connection with FIGS. 2, 3 and 4. In this embodiment the ceramic pieces 62 and 64 can freely rotate within the ceramic pieces 56 and 58, so that a change of the pitch of the bellows 14 or 16, respectively, will tilt the ceramic end pieces 62 and 64 into the desired angular position.

A typical calculated example for the dimensions of the upstream portion of the carbon black reactor shown in FIGS. 2 and 3 is given in the following table:

| | |
|---|---|
| D (internal diameter of the housing) | 3 inches |
| d (internal diameter of oxidant channel) | 1/2 inch |
| r (distance of main discharge axis from longitudinal axis) | 13/16 inch |
| s (diameter of the oil tube) | 1/4 inch |
| L (axial length of the flexible channels) | 3 inches |
| M (location of the oil discharge nozzle downstream of the burner discharge) | −1/4 to 6 inches |

Negative values for M indicate the oil discharge being located upstream of the burner discharge. The ranges and ratios of the dimensions defined above will generally and preferably be as follows, although reactors with dimensions outside of these ranges for specific purposes are within the scope of this invention.

| | | | |
|---|---|---|---|
| d/D | 1/6 | to | 0.49 |
| r/d | 13/22 | to | 5/2 |
| L/r | 3 | to | 13 |
| M | −s | to | 2D |
| s (inch) | 1/4 | to | 2 |
| d (inch) | 1/2 | to | 4 |
| r (inch) | 13/16 | to | 9 |

A further embodiment of this invention is shown in FIGS. 7, 8 and 9. Instead of using flexible tubings, pivotally arranged conduits and nozzles are provided for. Through an upstream plate 68, two air conduits 70 and 72, as well as two concentrical gas conduits 74 and 76, are arranged. These conduits are essentially parallel to the longitudinal axis of the reactor. The conduits 70, 72, 74 and 76, after a 90° turn, are connected to a gas- and air-tight swivel joint 78, 80 and 82, 84, respectively. Attached to the downstream end of the air-tight swivel connections 78 and 80 are two 90° L-shaped conduits 86 and 88. Correspondingly, two 90° L-shaped gas conduits 90 and 92 are attached to the gas swivel joints 82 and 84, respectively. The tilting axis of the swivel joints 78 and 82 are coextensive, and correspondingly the rotational axis for the swivel joints 80 and 84 are coextensive. These turning axis in turn are coextensive with the axis of rods 96 and 98, respectively. These rods 96 and 98 extend through the housing wall 2 in bearings 100 and 102. Wheels 107 and 106 are provided for turning the axle and thereby the 90° L-shaped conduits 86, 88 and 90, 92, respectively. At the end of the gas conduit knee 90 and 92, respectively, two nozzles 42 and 44 are attached.

By turning the levers or wheels 104 or, respectively, 106, the gas nozzles 42 and, respectively, 44, together with the surrounding air channel conduits 86 and 88 can be turned from a position in which their discharge direction is parallel to the longitudinal reactor axis all the way into a position in which the discharge direction is 90° with respect to the reactor axis.

FIG. 9 shows the attachment of the nozzle 42, or respectively, 44, within the air channel conduits 86 and 88.

Advantageously, at least the downstream ends of the air and gas conduits are made from heat-resistant, preferably ceramic material. The four swivel joints 78, 80 and 82, 84, respectively, are also made from heat-resistant material and are provided with an air- and gas-tight high-temperature-resistant packing. The packing material that can be used for this purpose is, for example, asbestos; or expandable piston rings may be used.

Reasonable variations and modifications that will become apparent to those skilled in the art can be made in this invention without departing from the spirit and scope thereof.

I claim:
1. A carbon black reactor comprising
   a. a housing defined by a wall having an essentially cylindrical interior defining a longitudinal axis,
   b. at least one burner located inside of said housing for combusting fuel and oxidant to form hot combustion gases comprising
      aa. a fuel discharge nozzle for introducing fuel into said housing,
      bb. oxidant feed means for feeding oxidant into said housing essentially parallel to the direction of said fuel discharge and into admixture with said fuel leaving said discharge nozzle,
   said burner defining a main discharge axis for the fuel and oxidant, said discharge axis being located at a distance from said longitudinal axis,
   c. means attached to said housing for turning said burner essentially in a plane which is essentially parallel to said longitudinal axis and around a pivot axis to adjust the pivot angle which is defined as the angle between the direction of the longitudinal axis of said housing and the main discharge axis of said burner,
   d. hydrocarbon feed means attached to said housing for feeding hydrocarbon into said housing and into contact with said hot combustion gases, and
   e. withdrawal means attached to said housing for the withdrawal of carbon black-containing smoke from said housing.
2. A carbon black reactor in accordance with claim 1 comprising
   a. at least one flexible gas channel,
   b. at least one flexible oxidant channel, said channels surrounding the longitudinal axis of the reactor helically in the same rotational sense,
   c. means for adjusting the pitch of said helices constituting said means for turning said burner, and
   d. one gas discharge nozzle attached to each downstream end of each gas channel, the main gas discharge direction being essentially parallel to the tangent on the helix of the center of the channels at the discharge point.
3. A carbon black reactor in accordance with claim 1 wherein said means for turning said burner comprise a rod extending essentially in the direction of the pivot axis, which rod can be rotated and wherein said fuel discharge nozzle is attached to said rod.
4. A carbon black reactor in accordance with claim 2, wherein said gas channel is a flexible metal bellows.
5. A carbon black reactor in accordance with claim 2, wherein said means for adjusting the pitch comprise a plate to which the ends of said channels are attached, and which plate is arranged perpendicularly to the longitudinal axis of the reactor and for rotation around this longitudinal axis.
6. A carbon black reactor in accordance with claim 5, wherein the ends of said channels are arranged telescopically in said plate.
7. A carbon black reactor in accordance with claim 4, wherein said gas discharge nozzles are refractory end pieces with a gas discharge channel, these pieces being attached to the discharge ends of said flexible metal bellows.

8. A carbon black reactor in accordance with claim 3 wherein a flexible gas discharge conduit is attached to said nozzle.

9. A carbon black reactor in accordance with claim 3 wherein said gas discharge nozzle is connected to one side of a gas conduit connection having two sides which can be rotated relative to each other around the pivot axis which is coextensive with the rotational axis of said rod, and wherein the second side of said gas conduit connection is connected to a gas supply conduit arranged stationary in said housing.

10. A carbon black reactor in accordance with claim 3 wherein each gas discharge nozzle is surrounded by an oxidant channel, which oxidant channel in turn is connected to a source of oxidant gas.

11. A carbon black reactor in accordance with claim 10 wherein said oxidant channel is connected to one side of an oxidant conduit connection having two sides which can be rotated relatively to each other around an axis of rotation which is coextensive with the rotational axis of said rod and said pivot axis, and wherein the second side of said oxidant conduit connection is connected to an oxidant supply conduit arranged stationary in said housing.

* * * * *